Dec. 2, 1941.  G. A. WOOD ET AL  2,264,559
AUTOMATIC PILOT FOR AIRCRAFT
Filed July 30, 1938  2 Sheets—Sheet 1
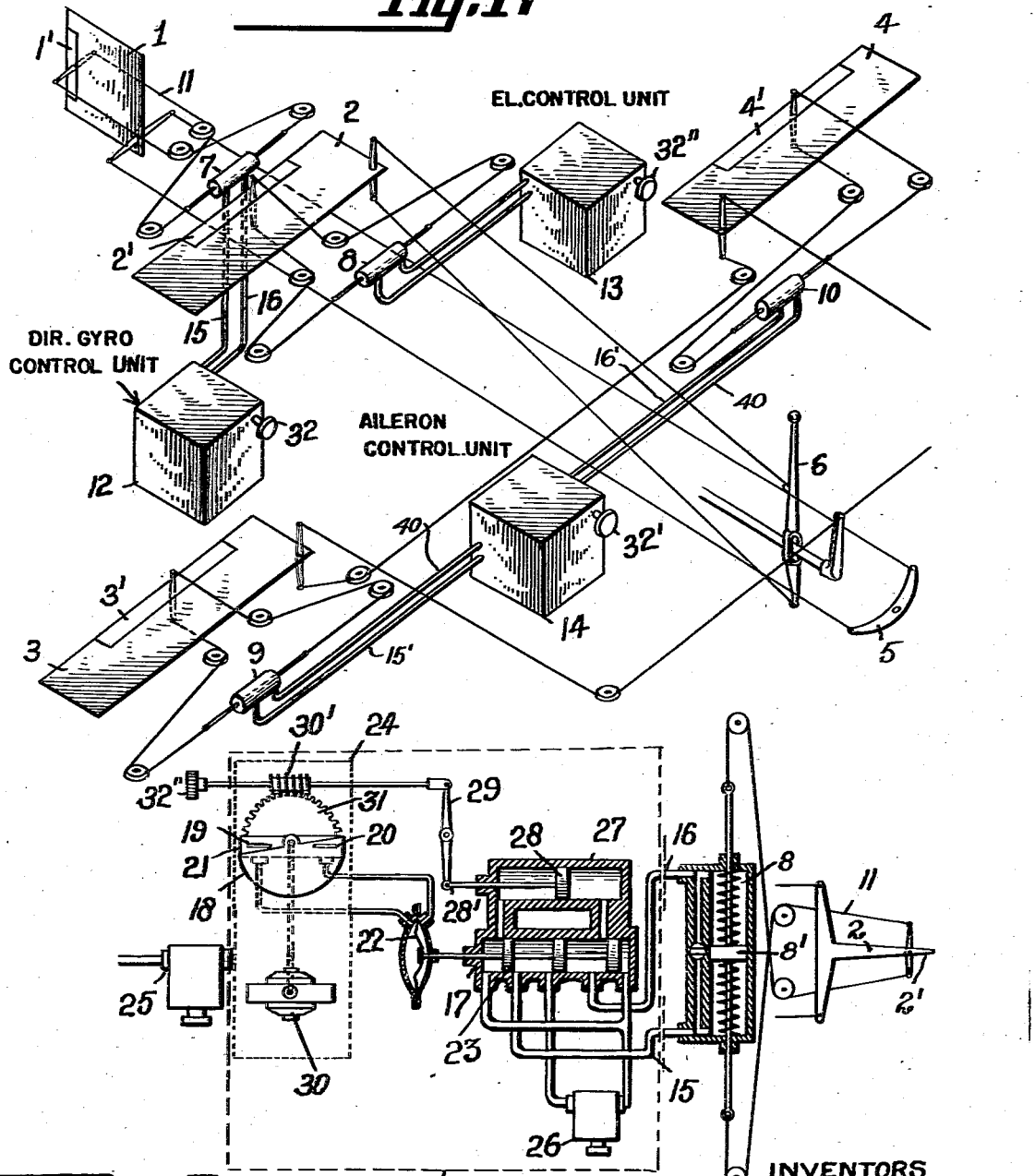
INVENTORS
GARFIELD A. WOOD
BERT G. CARLSON
BY Herbert H. Thompson
THEIR ATTORNEY

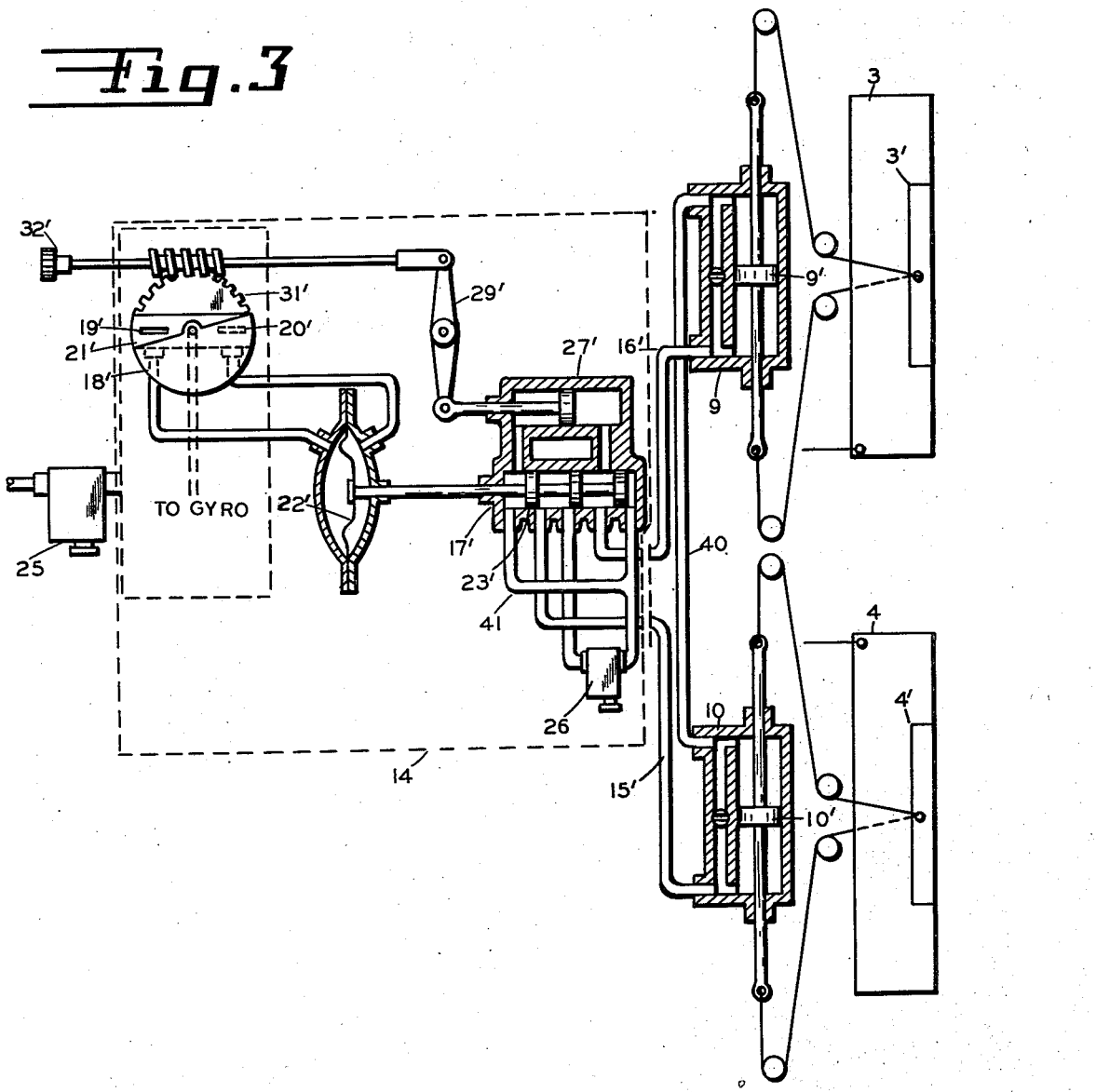

Patented Dec. 2, 1941

2,264,559

UNITED STATES PATENT OFFICE 2,264,559

AUTOMATIC PILOT FOR AIRCRAFT

Garfield A. Wood, Detroit, Mich., and Bert G. Carlson, Freeport, N. Y., assignors to Sperry Gyroscope Company, Inc., Brooklyn, N. Y., a corporation of New York Application July 30, 1938, Serial No. 222,176

1 Claim. (Cl. 244—78)

This invention relates to the combined automatic and manual control of airplanes. With the introduction of the Flettner rudder principle to airplane control surfaces, certain improvements and simplifications in the application of automatic control to airplanes have been made possible, and the purpose of this invention is to devise a new system combining automatic and manual control for aircraft having Flettner rudders, and in which the control has been greatly simplified.

For ordinary flying, all that need be done is to move the Flettner surfaces, and as these surfaces require very much less power than the direct movement of the main surfaces, we propose to move them by a much smaller and lighter automatic pilot system than would be possible were attempt made to move the main surfaces by the automatic pilot. Furthermore, by connecting the main surfaces directly or indirectly to the manual control, it is possible to over-control the automatic pilot without disconnecting the same or in any way interfering with its operation. This has an added safety factor as well as simplifying the automatic pilot.

According to our present invention, we place close to the surface being controlled a small servomotor or hydraulic cylinder having no follow-back or other connection to the automatic pilot other than through the same system of pipes that supplies the working fluid. To accomplish this purpose, we prefer to employ the system of hydraulic follow-back control disclosed in the copending application of B. G. Carlson, now Patent No. 2,139,878, dated December 13, 1938, for Hydropneumatic automatic pilots, assigned to the assignees of this application.

Referring to the drawings showing two forms our invention may assume,

Fig. 1 is a diagrammatic view of the controls of an airplane, showing the Flettner rudders and our simplified automatic pilot applied thereto.

Fig. 2 is a simplified view, partly in section, showing the principles of the follow-back control, said view being largely taken from the aforesaid copending application of B. G. Carlson.

Fig. 3 is a diagrammatic view similar to Fig. 2 but showing the aileron control with the connections from the single relay valve to the two aileron servomotors.

Referring first to Fig. 1, the conventional control surfaces of an airplane, namely, rudder 1, elevator 2 and ailerons 3 and 4 are shown as controlled directly from the usual manual control devices, represented by foot pedal 5 and joy stick 6, but it is understood that the manual control may be supplemented by power multiplying servomotors, if desired.

Each control surface is shown as provided with a supplemental Flettner control surface or tab 1', 2', 3' and 4', respectively, and it is these smaller surfaces which we propose to control directly from small, low power servomotors 7, 8, 9 and 10, situated in close proximity to the control surfaces so that very short connecting cables 11, or other connecting means, need be employed. Each servomotor is controlled from the proper gyro control unit or other course or attitude maintaining means or standard of position of the automatic pilot, the servomotor 7 being controlled, for instance, from the directional gyro control unit 12, the elevator servomotor 8 being controlled from the elevation control unit 13, and the ailerons being controlled from the aileron control unit 14. Usually the elevator and aileron control devices are both controlled from the same gyroscopic artificial horizon unit, but the controls are shown separated in Fig. 1 for the sake of clearness.

It should be noted that the only connections running from the rudders or servo units back to the gyro control units are the two pipes 15 and 16 in each instance, which supply the pressure fluid from the relay valve 17 at the control unit for operating the servomotor. Also, according to our invention, we prefer to provide separate servomotors 9 and 10 for each aileron instead of using a common servo with long connections extending from there to the ailerons, motors 9 and 10 of course being reversely operated, as shown more particularly in Fig. 3 as hereinafter described.

Fig. 2 shows diagrammatically the contents of each control unit, the gyroscope or other position maintaining means, or base line, being shown at 30. To the gyroscope is usually fixed a cut-off plate or valve member 18 which cooperates with a pair of differential air pick-off ports 19 and 20 in a second plate 21, so that the relative coverage of said ports by plate 18 governs the relative pressure on the two sides of the diaphragm or piston 22, thus controlling the position of the relay valve 23 which governs the flow of oil to the servo cylinder 8 through pipes 15 and 16.

According to this system, air is continuously withdrawn from the casing 24 of the directional gyro unit by a vacuum pump 25, and oil pressure is supplied to the relay valve from oil pump 26.

As outlined in the aforesaid Carlson patent, the follow-back in this case is provided by an auxiliary cylinder 27 and piston 28 which constitute therefore a follow-back servomotor and which is placed, in effect, in series with the oil flow through the main cylinder 8 so that the movement of the piston 28 is proportional to the movement of the piston 8'. Piston 28 is shown as having a follow-back connection through piston rod 28', lever 29 and tooth connection 30' with tooth segment 31, connected to the plate 21 so as to displace the same proportionally to the displacement of the Flettner rudder 2'. Preferably the gear connection is in the form of a worm and worm wheel so that by turning the knob 32" by hand, or through a servomotor from a distance, the plate 21 may be differentially displaced to change the course or attitude of the airplane. The airplane therefore may be normally flown entirely through the automatic pilot and Flettner rudders merely by the operation of the small knobs 32, 32' and 32" which, it will be understood, may all be located adjacent one another on the panel of the aircraft or in any other convenient position adjacent the aviator.

When, for any reason, the aviator wishes to assume direct control, he need take no other action than moving the control devices 5 and 6 directly by hand, which will over-control the automatic pilot.

Referring now to Fig. 3 showing the dual servomotors for the ailerons, the parts similar to Fig. 2 have the same reference numerals primed so that a detailed description need not be repeated. With the relay valve 23' in the position shown, the oil flow would be from pump 26 through the relay valve, thence through pipe 15' into the lower end of cylinder 10, out the upper end of the cylinder through transfer pipe 40, into the upper end of the cylinder 9, out the lower end of this cylinder through pipe 16', thence back to the relay valve, thence into the right-hand end of the follow-back cylinder 27', thence out the left-hand end of said cylinder, through the relay valve and through pipe 41 back to the pump 26.

It will also be understood that we use the term "Flettner rudder" in the broad sense to include all similar devices, such as trim tabs and trim control surfaces commonly used in connection with the control surfaces.

It is also obvious that we may employ the follow-back system shown in the copending application of Theodore W. Kenyon and Stephen J. Zand, now Patent No. 2,210,917, dated August 13, 1940, for Reactive servo system for automatic pilots, if desired.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

In an automatic pilot for aircraft, the combination with spaced ailerons thereon, each aileron having a Flettner tab, a fluid pressure motor adjacent each aileron and connected to the tab thereon, a common automatic control unit for both motors, and a follow-back fluid pressure motor at said unit and connected in series with its other two motors and operating as a follow-back connection to said unit.

GARFIELD A. WOOD.
BERT G. CARLSON.